(12) United States Patent
Ohashi

(10) Patent No.: US 11,078,219 B2
(45) Date of Patent: Aug. 3, 2021

(54) METHOD FOR PRODUCING COORDINATIVELY UNSATURATED METAL-ORGANIC FRAMEWORK AND COORDINATIVELY UNSATURATED METAL-ORGANIC FRAMEWORK

(71) Applicant: TOYOTA JIDOSHA KABUSHIKI KAISHA, Toyota (JP)

(72) Inventor: Yoshio Ohashi, Susono (JP)

(73) Assignee: Toyota Jidosha Kabushiki Kaisha

( * ) Notice: Subject to any disclaimer, the term of this patent is extended or adjusted under 35 U.S.C. 154(b) by 0 days.

(21) Appl. No.: 16/435,743

(22) Filed: Jun. 10, 2019

(65) Prior Publication Data
US 2020/0010486 A1    Jan. 9, 2020

(30) Foreign Application Priority Data

Jul. 5, 2018 (JP) .............. JP2018-128584
Oct. 17, 2018 (JP) .............. JP2018-196162

(51) Int. Cl.
C07F 7/00 (2006.01)
C07F 5/00 (2006.01)

(52) U.S. Cl.
CPC .............. *C07F 7/003* (2013.01); *C07F 5/003* (2013.01)

(58) Field of Classification Search
None
See application file for complete search history.

(56) References Cited

U.S. PATENT DOCUMENTS
2012/0180884 A1    7/2012    Brunello et al.

FOREIGN PATENT DOCUMENTS
FR    2 951 153 A1    4/2011
WO    2014042800 A1    3/2014

OTHER PUBLICATIONS

Xu et al. New J. Chem. 43, 2019, 4092.*
Hiroyasu Furukawa et al., "Water Adsorption in Porous Metal-Organic Frameworks and Related Materials," JACS, Mar. 3, 2014, pp. 4369-4381.
(Continued)

*Primary Examiner* — Clinton A Brooks
(74) *Attorney, Agent, or Firm* — Dickinson Wright, PLLC

(57) ABSTRACT

[OBJECT] To provide a metal-organic framework having high hygroscopicity under low humidity conditions, and a method for producing such a metal-organic framework.
[SOLVING MEANS] A method for producing a coordinatively unsaturated metal-organic framework includes the steps of providing a precursor metal-organic framework comprising a metal cluster and a polycarboxylic acid ion and a monocarboxylic acid ion coordinated to the metal cluster, and allowing the precursor metal-organic framework and a metal salt having a Lewis acidity to coexist in a solvent to desorb at least a part of the monocarboxylic acid ion, which is coordinated to the metal cluster, from the metal cluster, as well as a coordinatively unsaturated metal-organic framework, including an $M_6O_{8-x}(OH)_x$-type metal cluster and carboxylic acid ions including a polycarboxylic acid ion as a polydentate ligand and a $C_{1-3}$ monocarboxylic acid ion as a monodentate ligand coordinated to the metal cluster.

11 Claims, 8 Drawing Sheets

(56) References Cited

OTHER PUBLICATIONS

Juncong Jiang et al., "Superacidity in Sulfated Metal-Organic Framework," JACS, Aug. 26, 2014, pp. 12844-12847.
Y. Kalinovskyy et al., "Microwave-assisted activation and modulator removal in zirconium MOFs for buffer-free CWA hydrolysis," Dalton Trans., 2017, 46, pp. 15704-15709.
Min Kim et al., "Postsynthetic Ligand and Cation Exchange in Robust Metal-Organic Frameworks," JACS, Oct. 8, 2012, pp. 18082-18088.
Weibin Liang et al., "Tuning pore size in a zirconium-tricarboxylate metal-organic framework," CrystEngComm, 2014, 16, pp. 6530-6533.
Anastasis Permyakova et al., "Design of salt-metal organic framework composites for seasonal heat storage applications," J. Mater Chem. A, 2017, vol. 5, pp. 12889-12898.

* cited by examiner $M_6O_{8-x}(OH)_x$

METHOD FOR PRODUCING COORDINATIVELY UNSATURATED METAL-ORGANIC FRAMEWORK AND COORDINATIVELY UNSATURATED METAL-ORGANIC FRAMEWORK

FIELD

The present disclosure relates to a method for producing a coordinatively unsaturated metal-organic framework and a coordinatively unsaturated metal-organic framework.

BACKGROUND

Metal-organic frameworks (MOF), which are porous compounds, are materials which are also referred to as porous coordination polymers (PCP). MOFs have a coordination network structure having a high surface area which is formed by interaction between a metal and an organic ligand.

Since MOFs can be used as the material for gas adsorption or separation, sensors, and catalysts, research and development regarding MOFs has been advancing. Furthermore, MOFs can adsorb water vapor, and thus, have been considered for use as the hygroscopic material in a chemical heat pump (adsorption heat pump) or humidity control system used for automobiles, residences, and manufacturing facilities.

Non-Patent Literature 1 describes an MOF (MOF-808) comprising $Zr^{4+}$ as a metal ion, a trimesic acid ion as the polydentate ligand, and a formic acid ion as the monodentate ligand.

Non-Patent Literature 2 describes an MOF comprising a sulfate ion obtained by immersing an MOF (MOF-808), which comprises $Zr^{4+}$ as a metal ion, a trimesic acid ion as the polydentate ligand, and a formic acid ion as the monodentate ligand, in sulfuric acid to substitute the formic acid ion with the sulfate ion, and describes the catalytic activity thereof.

Non-Patent Literature 3 describes an MOF comprising $Ti^{4+}$ or $Hf^{4+}$ obtained by reacting an MOF (UiO-66), which comprises $Zr^{4+}$ as the metal ion and a terephthalic acid ion as the polydentate ligand, with $TiCpCl_2$ or $HfCl_4$ to substitute the $Zr^{4+}$ with the $Ti^{4+}$ or $Hf^{4+}$.

Non-Patent Literature 4 describes an MOF comprising $Zr^{4+}$ as the metal ion, a trimesic acid ion as the polydentate ligand, and a formic acid ion, acetic acid ion, or propionic acid ion as the monodentate ligand.

CITATION LIST

Non-Patent Literature

[NPL 1] H. Furukawa et al., "Water Adsorption in Porous Metal-Organic Frameworks and Related Materials", J. Am. Chem. Soc. 2014, 136, pp 4369-4381

[NPL 2] J. Jiang et al., "Superacidity in Sulfated Metal-Organic Framework-808", J. Am. Chem. Soc. 2014, 136, pp 12844-12847

[NPL 3] M. Kim et al., "Postsynthetic Ligand and Cation Exchange in Robust Metal-Organic Frameworks", J. Am. Chem. Soc. 2012, 134, pp 18082-18088

[NPL 4] W. Liang et al., "Tuning Pore Size in a Zirconium-Tricarboxylate Metal-Organic Framework", CrystEngComm. 2014, 16, pp 6530-6533

SUMMARY

Technical Problem

The MOFs described in the above literature exhibit water vapor adsorption and desorption properties in response to changes in relative humidity. However, these MOFs, under low relative humidity conditions, have low hygroscopicity or, in some cases, do not exhibit hygroscopicity. Thus, when used as the hygroscopic material for a chemical heat pump, the heat output of these MOFs may be insufficient in some cases, and when used as the hygroscopic material for a humidity control system, the dehumidification performance of these MOFs may be insufficient in some cases.

The present disclosure provides a method for efficiently producing a metal-organic framework that at least partially solves the above problems.

Solution to Problem

As a result of rigorous investigation, the present inventors have conceived of the present disclosure as described below.

Aspect 1

A method for producing a coordinatively unsaturated metal-organic framework, comprising:
providing a precursor metal-organic framework comprising a metal cluster and a polycarboxylic acid ion and a monocarboxylic acid ion which are coordinated to the metal cluster, and
allowing the precursor metal-organic framework and a metal salt having a Lewis acidity to coexist in a solvent to desorb at least a part of the monocarboxylic acid ion which is coordinated to the metal cluster, from the metal cluster.

Aspect 2

The method according to Aspect 1,
wherein the metal cluster is an $M_6O_{8-x}(OH)_x$-type metal cluster,
wherein M is a group IV element ion or a rare earth ion,
wherein the polycarboxylic acid ion and the monocarboxylic acid ion coordinated to the metal cluster are a polycarboxylic acid ion as a polydentate ligand and a $C_{1-3}$ monocarboxylic acid ion as a monodentate ligand, respectively, and
wherein less than six monocarboxylic acid ions are coordinated to each metal cluster.

Aspect 3

The method according to Aspect 2, wherein M is at least one selected from the group consisting of $Zr^{4+}$, $Hf^{4+}$, and $Ce^{4+}$.

Aspect 4

The method according to any one of Aspects 1 to 3, wherein the monocarboxylic acid ion is at least one selected from the group consisting of a formic acid ion, an acetic acid ion, and a propionic acid ion.

Aspect 5

The method according to any one of Aspects 1 to 4, wherein the metal salt having a Lewis acidity is a halide.

Aspect 6

A coordinatively unsaturated metal-organic framework, comprising:
an $M_6O_{8-x}(OH)_x$-type metal cluster, and carboxylic acid ions coordinated to the metal cluster,
wherein M is a tetravalent group IV element ion or a rare earth ion,
wherein the carboxylic acid ions coordinated to the metal cluster comprise a polycarboxylic acid ion as a polydentate ligand and a monocarboxylic acid ion as a monodentate ligand,
wherein a plurality of the metal clusters are bonded to each other due to the polycarboxylic acid ion,
wherein the amount of monocarboxylic acid ions coordinated to the metal cluster is 80% or less, when the maximum amount of monocarboxylic acid ions which can coordinate with the metal cluster is 100%, and
wherein the maximum amount of monocarboxylic acid ions which can coordinate with the metal cluster is six for each metal cluster.

Aspect 7

The coordinatively unsaturated metal-organic framework according to Aspect 6, wherein the amount of monocarboxylic acid ions coordinated to the metal cluster is in the range of 5% to 80%.

Aspect 8

The coordinatively unsaturated metal-organic framework according to Aspect 7, wherein M is at least one selected from the group consisting of $Zr^{4+}$, $Hf^{4+}$, and $Ce^{4+}$.

Aspect 9

The coordinatively unsaturated metal-organic framework according to any one of Aspects 6 to 8, wherein the monocarboxylic acid ion is a $C_{1-3}$ monocarboxylic acid ion.

Aspect 10

The coordinatively unsaturated metal-organic framework according to any one of Aspects 6 to 9, wherein the monocarboxylic acid ion is at least one selected from the group consisting of a formic acid ion, an acetic acid ion, and a propionic acid ion.

Aspect 11

The coordinatively unsaturated metal-organic framework according to any one of Aspects 6 to 10, further comprising a out-of-cluster metal ion.

Aspect 12

The coordinatively unsaturated metal-organic framework according to Aspect 11, wherein the out-of-cluster metal ion is at least one selected from the group consisting of $Li^+$, $Mg^{2+}$, $Al^{3+}$, $Sc^{3+}$, $Y^{3+}$, $Ti^{4+}$, $Zr^{4+}$, and $Hf^{4+}$.

Advantageous Effects of Invention

According to the present disclosure, a method for efficiently producing a metal-organic framework which can at least partially solve the problems described above and a metal-organic framework which can at least partially solve the problems described above can be provided.

DESCRIPTION OF EMBODIMENTS

Figure 1:
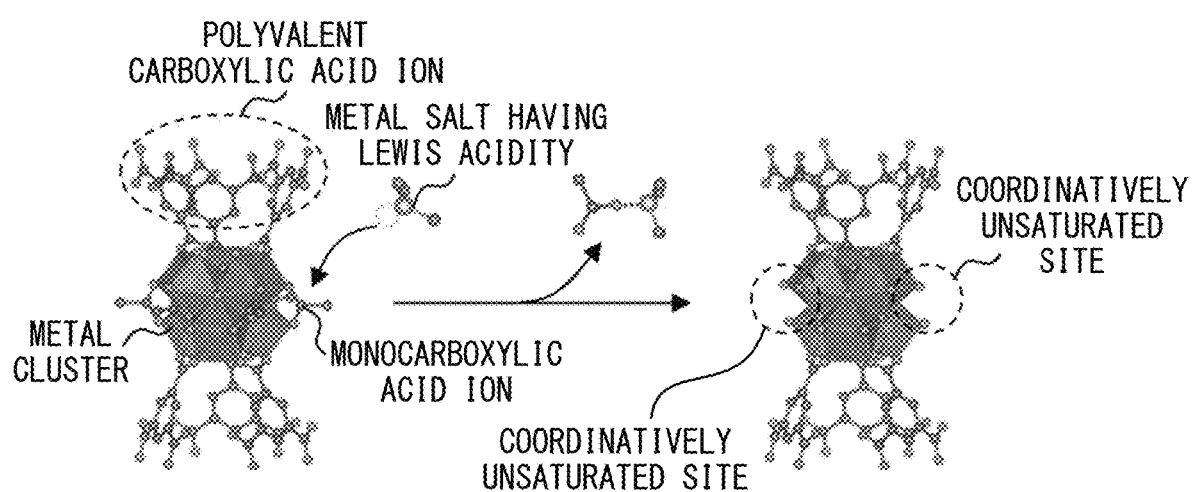
FIG. 1 is a view showing an example of the method of the present disclosure for producing a coordinatively unsaturated MOF.

The present disclosure will be described below while referring to the drawings. The aspects shown below are examples of the present disclosure. The present disclosure is not limited by the aspects shown below.

Coordinatively Unsaturated Metal-Organic Framework Production Method

The method of the present disclosure for producing a coordinatively unsaturated MOF comprises providing a precursor metal-organic framework comprising a metal cluster and a polycarboxylic acid ion and a monocarboxylic acid ion which are coordinated to the metal cluster, and allowing the precursor metal-organic framework and a metal salt having a Lewis acidity to coexist in a solvent to desorb at least a part of the monocarboxylic acid ion, which is coordinated to the metal cluster, from the metal cluster.
According to the method of the present disclosure, a coordinatively unsaturated MOF can be produced.
FIG. 1 shows a specific example of the method of the present disclosure in which, due to the metal salt having a Lewis acidity, monocarboxylic acid ions are removed from a single metal cluster constituting the MOF, whereby the MOF is in a coordinatively unsaturated state.

In the precursor MOF shown on the left side of FIG. 1, a trimesic acid ion, which is a tridentate ligand polycarboxylic acid, and an acetic acid ion, which is a monodentate ligand monocarboxylic acid, are coordinated to $Zr_6O_4(OH)_4$ as the metal cluster. The polycarboxylic acid functions as an organic linker between adjacent metal clusters, and forms a network-like periodic structure.

In the example shown in FIG. 1, $YCl_3$, which is a metal salt having a Lewis acidity, is allowed to act on the monocarboxylic acid ion coordinated to the metal cluster to desorb the monocarboxylic acid ion from the metal cluster. As a result, a coordinatively unsaturated MOF having one or a plurality of coordinatively unsaturated sites (the portions surrounded by dotted lines), as shown on the right side of FIG. 1, and a complex of a monocarboxylic acid ion and the metal from the metal salt are formed. This complex may remain in the coordinatively unsaturated MOF in some cases.

Each constituent element of the method of the present disclosure will be described below.

Provision of Precursor Metal-Organic Framework

In the method of the present disclosure, a precursor metal-organic framework (precursor MOF) comprising a metal cluster and a polycarboxylic acid ion and a monocarboxylic acid ion coordinated to the metal cluster is provided.

Such a precursor MOF can be obtained by known means. For example, the precursor MOF can be synthesized by mixing a metal ion source, a polycarboxylic acid compound, and a monocarboxylic acid compound, dissolving these components in a solvent as necessary, and heating. For example, the precursor MOF can be synthesized by heating a solution comprising a metal ion source, a polycarboxylic acid compound, and a $C_{1-3}$ monocarboxylic acid compound.

The metal ion source for synthesizing the precursor MOF is not particularly limited as long as a metal cluster constituting the coordinatively unsaturated MOF described above can be formed therewith. A compound comprising a metal constituting the metal cluster, for example, a metal halide or the like, can be used as the metal ion source. When the metal cluster includes an oxygen atom, a metal halide, an oxymetal compound, or a metal oxide can be used as the metal ion source.

The metal ion source may be at least one selected from the group consisting of a zirconium compound, a hafnium compound, and a cerium compound. In this case, for example, zirconium oxychloride octahydrate ($ZrOCl_2 \cdot 8H_2O$) or zirconium chloride ($ZrCl_4$) can be used as the zirconium compound, and, for example, hafnium oxychloride octahydrate ($HfOCl_2 \cdot 8H_2O$) or hafnium chloride ($HfCl_4$) can be used as the hafnium compound.

The polycarboxylic acids and monocarboxylic acids, or the salts or acid anhydrides thereof, corresponding to the polycarboxylic acid ion and monocarboxylic acid ion described regarding the coordinatively unsaturated MOF can be used as the polycarboxylic acid compound and monocarboxylic acid compound for synthesis of the precursor MOF. Examples of the polycarboxylic acid salt and the monocarboxylic acid salt include lithium salt, sodium salt, potassium salt, or ammonia salt of a polycarboxylic acid. In general, polycarboxylic acid compounds are di-, tri-, or tetra-polycarboxylic acid compounds.

The proportion of the polycarboxylic acid ions, with respect to the total molar number of carboxylic acid ions in the precursor MOF, may be 20 mol % or more, 30 mol % or more, or 40 mol % or more, and may be 95 mol % or less, 90 mol % or less, or 85 mol % or less.

The proportion of monocarboxylic acid ions, with respect to the total molar number of carboxylic acid ions in the precursor MOF, may be 5 mol % or more, 10 mol % or more, or 15 mol % or more, and may be 80 mol % or less, 70 mol % or less, or 60 mol % or less.

The mixture of the metal ion source, the polycarboxylic acid compound, and the monocarboxylic acid compound may further include a compound for providing the above polydentate ligand other than the polycarboxylic acid.

The solvent for forming the precursor MOF is not particularly limited as long as it is capable of dispersing or dissolving the above-described metal ion source, polycarboxylic acid compound, monocarboxylic acid compound, and, as necessary, the compound for providing the polydentate ligand described above other than the polycarboxylic acid, and the precursor MOF can be synthesized in a heating process, which is described later.

From the viewpoint of promoting the synthesis of the precursor MOF, an amide is preferably used as the solvent. Amides decompose at high temperatures to gradually produce an amine base. The produced amine base deprotonates the carboxyl groups of the polycarboxylic acid compound and the monocarboxylic acid compound and promotes the formation of polycarboxylic acid ions and monocarboxylic acid ions, which are coordinatable to the metal cluster. Examples of the amide include N,N-dimethylformamide (DMF), N-N-diethylformamide (DEF), and combinations thereof.

The aforementioned monocarboxylic acid compound can be used as the solvent. In one embodiment, a combination of an amide and a monocarboxylic acid compound is used as the solvent.

The heating for synthesis of the precursor MOF can be carried out under solvothermal conditions.

For example, a precursor MOF comprising a metal cluster and a polycarboxylic acid ion and a monocarboxylic acid ion coordinated to the metal cluster can be synthesized by loading a metal ion source, a polycarboxylic acid compound, a monocarboxylic acid compound, and if necessary, a solvent such as N,N-dimethylformamide (DMF) or N,N-diethylformamide (DEF) into a pressure vessel such as an autoclave, and heating at a temperature of 100° C. or more, or 120° C. or more, and 180° C. or less, or 150° C. or less for 6 hours or more, or 24 hours or more, and 100 hours or less, or 72 hours or less.

The precursor MOF may be purified by filtration, washing, or drying, as necessary, or the solution containing the synthesized precursor MOF may be used as-is in subsequent processes. Washing can be carried out once or a plurality of times using a solvent such as DMF or acetone. Drying can be carried out by allowing the solution to stand at room temperature or by heating under normal pressure or reduced pressure.

Desorption of Monocarboxylic Acid Ion

A coordinatively unsaturated MOF can be produced by allowing the precursor MOF and a metal salt having a Lewis acidity to coexist in a solvent to desorb at least a part of the monocarboxylic acid ions which are coordinated to the metal cluster, from the metal cluster.

Metal Salt Having Lewis Acidity

Lewis acids are defined as receptors for electron pairs.

Metals included in a metal salt having a Lewis acidity act as Lewis acids to desorb monocarboxylic acid ions, which are Lewis bases, from the metal cluster. Since desorption of the carboxylic acid ions by the Lewis acid proceeds more favorably for monocarboxylic acid ions, which are monodentate ligands, rather than for polycarboxylic acid ions, which are polydentate ligands, it is possible to selectively desorb monocarboxylic acid ions while maintaining the crystal structure of the MOF to generate coordinatively unsaturated sites in at least a part of the metal cluster.

In the present disclosure, the Lewis acid is preferably non-protonic.

The metal salt having a Lewis acidity is preferably a halide and is more preferably a chloride or bromide. Halogen ions derived from the halide may be included in the coordinatively unsaturated MOF in some cases. Though such halogen ions, in particular, chlorine ions and bromine ions, can coordinate to the metal cluster, since the halogen ions easily undergo ligand substitution with water molecules and detach from the metal cluster, they do not significantly lower the hygroscopic performance of the coordinatively unsaturated MOF.

The metal salt having a Lewis acidity preferably contains a metal in which the number of electrons in the d-orbit of the metal ion having a stable oxidation number state is 0 or 10. A metal salt containing such a metal acts as a Lewis acid and can promote desorption of the monocarboxylic acid ion, which is a base, from the metal cluster.

It is preferable that the metal salt having a Lewis acidity be one or more selected from the group consisting of $LiCl$, $MgCl_2$, $AlCl_3$, $ScCl_3$, $YCl_3$, $ZrCl_4$, $HfCl_4$, $MgBr_2$, and $TiCl_2Cp_2$. Cp is a cyclopentadienyl anion or a derivative thereof, such as a pentamethylcyclopentadienyl anion (Cp*). By using these metal salts, desorption of monocarboxylic acid ions from the metal cluster is promoted, whereby a coordinatively unsaturated MOF having high hygroscopicity can be obtained.

The concentration of the metal salt having a Lewis acidity in the solvent may be, for example, 5 mmol/L or more, 10 mmol/L or more, 20 mmol/L or more, 30 mmol/L or more, or 60 mmol/L or more, and may be 600 mmol/L or less, 500 mmol/L or less, 300 mmol/L or less, or 200 mmol/L or less.

The precursor MOF and the metal salt having a Lewis acidity are allowed to stand in a coexisting state in the solvent. The precursor MOF can coexist in the solvent with metal salt having a Lewis acidity by immersing the precursor MOF in a solution comprising the metal salt having a Lewis acidity and the solvent.

The solvent is not particularly limited as long as the precursor MOF and the metal salt having a Lewis acidity can be dispersed or dissolved therein. For example, water, alcohols such as methanol, ethanol, and isopropanol, amides such as N,N-dimethylformamide (DMF) and N,N-diethylformamide (DEF), or combinations thereof can be used as the solvent.

The desorption of monocarboxylic acid ions from the metal cluster may proceed at room temperature or may proceed upon heating. For example, a solution comprising the precursor MOF, the metal salt having a Lewis acidity, and the solvent can be heated. The heating temperature may be, for example, 30° C. or more, or 50° C. or more, and may be 120° C. or less, or 100° C. or less. Furthermore, the heating time may be 6 hours or more, 24 hours or more, or 48 hours or more and may be 100 hours or less, or 72 hours or less.

The coordinatively unsaturated MOF can be produced by desorbing at least a part of the monocarboxylic acid ions from the metal cluster. The obtained coordinatively unsaturated MOF can be purified by filtration, washing, or drying, as necessary. Washing can be carried out once or a plurality of times using a solvent such as DMF or acetone. Drying can be carried out by allowing the MOF to stand at room temperature or by heating under normal pressure or reduced pressure.

Coordinatively Unsaturated Metal-Organic Framework

The coordinatively unsaturated metal-organic framework (coordinatively unsaturated MOF) of the present disclosure comprises a metal cluster and carboxylic acid ions coordinated to the metal cluster. At least a part of the carboxylic acid ions are polycarboxylic acid ions, which bond a plurality of metal clusters to each other, and at least a part of the metal cluster includes coordinatively unsaturated sites. The coordinatively unsaturated MOF of the present disclosure can be produced by the aforementioned production method of the present disclosure.

More specifically, the coordinatively unsaturated metal-organic framework of the present disclosure comprises an $M_6O_{8-x}(OH)_x$-type metal cluster and carboxylic acid ions, which are coordinated to the metal cluster, wherein M is a group IV element ion or a rare earth ion, wherein the carboxylic acid ions coordinated to the metal cluster are a polycarboxylic acid ion as a polydentate ligand and a monocarboxylic acid ion as a monodentate ligand, wherein a plurality of the metal clusters are bonded to each other due to the polycarboxylic acid ion, wherein the amount of monocarboxylic acid ions coordinated to the metal cluster is 80% or less when the maximum amount of monocarboxylic acid ions which can coordinate with the metal cluster is 100%, and wherein the maximum amount of monocarboxylic acid ions which can coordinate with the metal cluster is six for each metal cluster.

The term "coordinatively unsaturated sites" of the coordinatively unsaturated MOF of the present disclosure means coordination sites at which carboxylic acid ions comprising monocarboxylic acid ions and polycarboxylic acid ions are not coordinated and other polyvalent ligands are not coordinated. Molecules such as water ($H_2O$) or dimethylformamide (DMF) may be coordinated to the coordinatively unsaturated sites, and these molecules may be derived from the solvent.

It is presumed that the organic group moiety which is the hydrophobic moiety of the carboxylic acid ion which is coordinated to the metal cluster, for example, the methyl group in an acetic acid ion, decreases the hygroscopicity of the MOF under low humidity conditions because the methyl group is oriented on the pore surface of MOF and exhibits hydrophobicity.

It is believed that the coordinatively unsaturated MOF of the present disclosure can exhibit high hygroscopicity even under low humidity conditions since ligands having such hydrophobic sites are at least partially removed from the coordinatively unsaturated sites of the coordinatively unsaturated MOF of the present disclosure. Furthermore, it is thought that by changing the number of coordinatively unsaturated sites in the coordinatively unsaturated MOF, the humidity that can be adsorbed can be easily controlled.

Thus, the adsorption humidity of the coordinatively unsaturated MOF of the present disclosure may be 30% or less, 28% or less, 26% or less, 24% or less, 22% or less, or 20% or less, and may be 10% or more, 12% or more, 16% or more, or 18% or more. Note that in the present disclosure, adsorption humidity means the relative humidity when adsorbing water vapor in an amount equal to half of the maximum water vapor adsorption amount.

The hygroscopicity of the coordinatively unsaturated MOF will be described with reference to FIG. 1, which shows an example of the method of the present disclosure for producing the coordinatively unsaturated MOF.

In the MOF shown on the left side of FIG. 1, as an example of a conventional MOF, a trimesic acid ion, which is a tridentate ligand polycarboxylic acid, and an acetic acid ion, which is a monodentate ligand monocarboxylic acid ion, are coordinated to $Zr_6O_4(OH)_4$ as the metal cluster. The polycarboxylic acid functions as an organic linker between adjacent metal clusters to form a network-like periodic structure.

In the coordinatively unsaturated MOF shown on the right side of FIG. 1 as an example of the coordinatively unsaturated MOF of the present disclosure, a part of the metal cluster includes one or a plurality of coordinatively unsaturated sites (the portions surrounded by dotted lines). Since these coordinatively unsaturated sites contribute to the hydrophilization of the pore surfaces of the coordinatively unsaturated MOF, it is believed that the adsorption of water into the pores of the coordinatively unsaturated MOF is promoted as compared to MOFs lacking coordinatively unsaturated sites.

Since the pore diameters of conventional MOFs are several times larger than that of water molecules, and water molecules are adsorbed in the pores as results of the interaction of water molecules with the pore surface and the interaction between the water molecules, it is believed that hydrophilization of the pore surface has a significant influence on the improvement of hygroscopicity. Furthermore, it is also believed that hygroscopicity can be controlled by changing the number of coordinatively unsaturated sites in the coordinatively unsaturated MOF.

The coordinatively unsaturated MOF of the present disclosure can be used, depending on application, in a powder form or in the form of pellets or tablets. Furthermore, when forming the coordinatively unsaturated MOF of the present disclosure, a polymer binder or the like may be used.

Each constituent element constituting the coordinatively unsaturated MOF of the present disclosure will be described below.

Metal Cluster

In the coordinatively unsaturated MOF of the present disclosure, the metal cluster determines the vertex shape in the periodic structure of the coordinatively unsaturated MOF. Any metal cluster capable of forming an MOF can be used as the metal cluster.

For example, an $M_6O_{8-x}(OH)_x$-type metal cluster can be used as the metal cluster of the coordinatively unsaturated MOF of the present disclosure.

Figure 2:
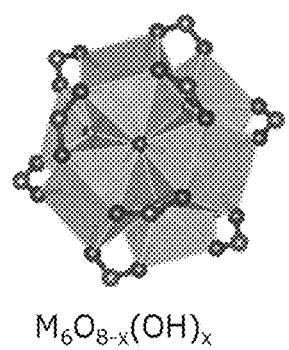
FIG. 2 is a view showing an example of a metal cluster which can be used in the coordinatively unsaturated MOF of the present disclosure.

This metal cluster has the structure shown in FIG. 2, wherein M is a tetravalent group IV periodic table element or a rare earth ion, for example, $Zr^{4+}$, $Hf^{4+}$, and $Ce^{4+}$, in particular, $Zr^{4+}$, and the saturated coordination number thereof is 12. Examples of MOFs including this metal cluster include MOF-808, UiO-66, and MOF-801. Furthermore, examples of ligands for this metal cluster include trimesic acid, formic acid, terephthalic acid, and fumaric acid.

For example, when the metal cluster of the coordinatively unsaturated MOF of the present disclosure is this $M_6O_{8-x}(OH)_x$-type metal cluster, the carboxylic acid ions coordinated to the metal cluster include a polycarboxylic acid ion as a polydentate ligand and a $C_{1-3}$ monocarboxylic acid ion as a monodentate ligand, and less than 6, 5 or less, or 4 or less monocarboxylic acid ions may be coordinated to the metal cluster.

Note that, in the case of an $M_6O_{8-x}(OH)_x$-type metal cluster, the maximum amount of monocarboxylic acid ions which can coordinate to the metal cluster is six for each metal cluster.

Thus, in the present disclosure, it is preferable that the amount of monocarboxylic acid ions coordinated to the metal cluster be 80% or less when the maximum amount of monocarboxylic acid ions which can coordinate to the $M_6O_{8-x}(OH)_x$-type metal cluster is 100%, more preferably in the range of 5% to 80%. Furthermore, the amount of monocarboxylic acid ions coordinated to this metal cluster may be 7% or more, 10% or more, 15% or more, 20% or more, 25% or more, 30% or more, 35% or more, 40% or more, 45% or more, or 50% or more, and may be 95% or less, 90% or less, 85% or less, 80% or less, 78% or less, or 75% or less.

Polycarboxylic acid Ion

The polycarboxylic acid ions function as an organic linker by coordinating the carboxylate group thereof to the metal cluster and bond a plurality of metal clusters to each other. This forms the periodic structure of the coordinatively unsaturated MOF. Any arbitrary polycarboxylic acid with which an MOF can be formed can be used, and in general, polycarboxylic acid ions are di-, tri-, or tetra-polycarboxylic acid ions.

Examples of divalent carboxylic acid ions include substituted or unsubstituted isophthalic acid ions, substituted or unsubstituted terephthalic acid ions, oxalate ions, fumarate ions, malonate ions, trans,trans-muconic acid ions, cis,cis-muconic acid ions, 2-6-naphthalenedicarboxylic acid ions, 9,10-anthracenedicarboxylic acid ions, 2,2'-diamino-4,4'-stilbendicarboxylic acid ions, 2,2'-dinitro-4,4'-stilbenedicarboxylic acid ions, and 2,3-pyrazinedicarboxylic acid ions.

Substituted or unsubstituted isophthalic acid ions can be represented by Formula 1.

[Chem. 1]

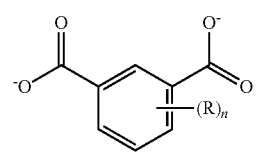

1

In Formula 1, each R represents an independent substituent other than a carboxylate group, and n is an integer from 0 to 4. R is not particularly limited as long as the ions described above can function as an organic linker to form an MOF. Examples thereof include hydroxy groups, nitro groups, fluoro groups, chloro groups, bromo groups, iodine groups, cyano groups, methyl groups, ethyl groups, tert-butyl groups, and ethynyl groups. It is preferable that R lack a positive charge which cancels the negative charge of the carboxylate ion. Examples of R having a positive charge include ammonium groups such as a trimethylammonium group ($-N(CH_3)_3^+$) or a triethylammonium group ($-N(C_2H_5)_3^+$).

Specific examples of the isophthalic acid ions represented by Formula 1 include isophthalate ions (m-$BDC^{2-}$), 5-hydroxyisophthalate ions, 5-nitroisophthalate ions, 5-tert-butylisophthalate ions, 5-ethynyl isophthalate ions, 5-chloroisophthalate ions, 5-bromoisophthalate ions, 5-cyanoisophthalate ions, and 4,6-dimethylisophthalate ions. The substituted or unsubstituted isophthalic acid ion represented by Formula 1 is preferably an isophthalic acid ion (m-$BDC^{2-}$).

The substituted or unsubstituted terephthalic acid ion can be represented by Formula 2.

[Chem. 2]

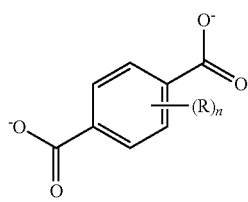

2

In Formula 2, each R represents an independent substituent other than a carboxylate group, and n is an integer from 0 to 4. R is not particularly limited as long as the ions described above can function as an organic linker to form an MOF. Examples thereof include hydroxy groups, nitro groups, fluoro groups, chloro groups, bromo groups, iodine groups, cyano groups, methyl groups, ethyl groups, tert-butyl groups, and ethynyl groups. It is preferable that R lack a positive charge which cancels the negative charge of the carboxylate ion. Examples of R having a positive charge include ammonium groups such as a trimethylammonium group ($-N(CH_3)_3^+$) or a triethylammonium group ($-N(C_2H_5)_3^+$).

Specific examples of substituted or unsubstituted terephthalic acid ions represented by Formula 2 include terephthalic acid ions (p-$BDC^{2-}$), 2-aminoterephthalic acid ions, 2,5-diaminoterephthalic acid ions, 2-hydroxyterephthalic acid ions, and 2,5-dihydroxy terephthalic acid ions. The substituted or unsubstituted terephthalic acid ions represented by Formula 2 is preferably a terephthalic acid ion (p-$BDC^{2-}$).

Examples of trivalent carboxylic acid ions include substituted or unsubstituted trimesic acid ions, 1,3,5-tris(4-carboxyphenyl)benzene ions, 1,3,5-triscarboxyphenylethynylbenzene ions, 4,4',4"-s-triazine-2,4,6-triyl-tribenzoic acid ions, 1,3,5-tris(4'-carobxy[1,1'-biphenyl]-4-yl)benzene ions, biphenyl-3-4'-5-tricarboxylic acid ions, and 4,4',4"-(1,3,5-triazine-2,4,6-triyl triimino)trisbenzoic acid ions.

Substituted or unsubstituted trimesic acid ions can be represented by Formula 3.

[Chem. 3]

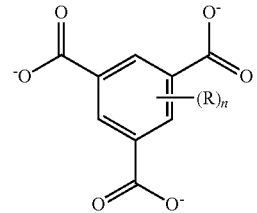

3

In Formula 3, each R is an independent substituent other than a carboxylate group, and n is an integer from 0 to 3. R is not particularly limited as long as the ions described above function as an organic linker to form an MOF. Examples thereof include hydroxy groups, nitro groups, fluoro groups, chloro groups, bromo groups, iodine groups, cyano groups, methyl groups, ethyl groups, tert-butyl groups, and ethynyl groups.

Specific examples of substituted or unsubstituted trimesic acid ions represented by Formula 3 include trimesic acid ions ($BTC^{3-}$), 2-hydroxy-1,3,5-benzenetricarboxylic acid ions, 2-nitro-1,3,5-benzenetricarboxylic acid ions, 2-chloro-1,3,5-benzenetricarboxylic acid ions, 2-bromo-1,3,5-benzenetricarboxylic acid ions, and 2-methyl-1,3,5-benzenetricarboxylic acid ions. The substituted or unsubstituted trimesic acid ions represented by Formula 1 is preferable a trimesic acid ion ($BTC^{3-}$).

Examples of tetravalent carboxylic acid ions include [1,1':4',1"]terphenyl-3,3",5,5"-tetra carboxylic acid ions, 3,3',5,5'-tetracarboxydiphenylmethane ions, 1,2,4,5-tetrakis(4-carboxyphenyl)benzene ions, and biphenyl-3,3',5,5'-tetracarboxylic acid ions.

The polycarboxylic acid ion is preferably at least one selected from the group consisting of substituted or unsubstituted isophthalic acid ions, substituted or unsubstituted terephthalic acid ions, and substituted or unsubstituted trimesic acid ions. By using the aforementioned polycarboxylic acid ion, a network-like periodic structure having pores suitable for the adsorption of water vapor can be imparted to the coordinatively unsaturated MOF. The polycarboxylic acid ions may be a combination of divalent carboxylic acid ions and trivalent carboxylic acid ions.

The proportion of polycarboxylic acid ions may be 20 mol % or more, 30 mol % or more, or 40 mol % or more, and may be 95 mol % or less, 90 mol % or less, or 85 mol % or less using the total molar number of carboxylic acid ions as a baseline.

Monocarboxylic Acid Ion

The coordinatively unsaturated MOF may include a monocarboxylic acid ion coordinated to the metal cluster. The monocarboxylic acid ion functions as a monodentate ligand, suppresses the coordination of the polydentate ligand, such as a polycarboxylic acid ion, to the metal cluster, and can be used to control the periodic structure and crystalline shape (morphology) of the coordinatively unsaturated MOF.

The monocarboxylic acid ion is not particularly limited as long as the coordinatively unsaturated MOF can be formed therewith. Since the monocarboxylic acid ion is advantageous for the formation of the periodic structure of the coordinatively unsaturated MOF, the monocarboxylic acid ion is preferable a $C_{1-3}$ monocarboxylic acid ion. The $C_{1-3}$ monocarboxylic acid is preferably at least one selected from the group consisting of formic acid ions, acetic acid ions, and propionic acid ions, and more preferably at least one selected from the group consisting of formic acid ions and acetic acid ions.

The proportion of monocarboxylic acid ions may be 5 mol % or more, 10 mol % or more, or 15 mol % or more and may be 80 mol % or less, 70 mol % or less, or 60 mol % or less, with respect to the total molar number of carboxylic acid ions.

Polydentate Ligands Other Than Polycarboxylic acids

The coordinatively unsaturated MOF may include a polydentate ligand other than a polycarboxylic acid, such as a nitrogen-donor polydentate ligand. Examples of such nitrogen-donor polydentate ligands include imidazole ions, 2-methylimidazole (mIM) ions, 4,4'-bipyridyl, ethylenediamine, 1,4-diazabicyclo[2.2.2]octane (DABCO), pyrazine, 1,2-bis(4-pyridyl)ethane, and 1,2-bis(4-pyridyl)ethylene. Like the polycarboxylic acid ions, these polydentate ligands other than carboxylic acid ligands can function as an organic linker to bond a plurality of metal clusters to each other. In the present disclosure, a ligand containing both of two or more carboxylate groups and a nitrogen atom having a donor property is classified as polycarboxylic acid ion.

The proportion of the polydentate ligand other than a polycarboxylic acid may be 40 mol % or less, 30 mol % or less, or 20 mol % or less with respect to the total molar number of ligands coordinated to the metal cluster. Furthermore, the coordinatively unsaturated MOF may not include a polydentate ligand other than a polycarboxylic acid.

Metal Ion Not Incorporated in Metal Cluster (Out-Of-Cluster Metal Ion)

The coordinatively unsaturated MOF of the present disclosure may include a metal ion which is not incorporated in the metal cluster. In the present disclosure, a metal ion which is not incorporated in the metal cluster is referred to as an "out-of-cluster metal ion". As will be described below, the coordinatively unsaturated MOF of the present disclosure can be produced by allowing a precursor metal-organic framework and a metal solvent having a Lewis acidity to coexist in a solvent, and desorbing the monocarboxylic acid ions which are coordinated to the metal cluster. Thus, the coordinatively unsaturated MOF of the present disclosure may include metal ions derived from the metal salt used as out-of-cluster metal ions in some cases.

Though not to be bound by any particular theory, it is believed that the out-of-cluster metal ions form a complex with the monocarboxylic acid ions desorbed from the metal cluster, and balance the charge of the whole of the coordinatively unsaturated MOF as a result of the presence of such complex in, for example, the pores of the coordinatively unsaturated MOF.

The out-of-cluster metal ions may be at least one selected from the group consisting of $Li^+$, $Mg^{2+}$, $Al^{3+}$, $Sc^{3+}$, $Y^{3+}$, $Ti^{4+}$, $Zr^{4+}$, and $Hf^{4+}$.

Chemical Heat Pump

The coordinatively unsaturated metal-organic framework of the present disclosure can be used, for example, as the hygroscopic material in a chemical heat pump. The chemical heat pump in this case comprises a water storage part that stores water as a working medium, a hygroscopic material retention unit for retaining the hygroscopic material, and a water vapor flow path that circulates water vapor between the water storage part and the hygroscopic material retention part. In such a chemical heat pump, the water storage part may be used as both an evaporator and a condenser, or the water storage part may be used as an evaporator and the water vapor may be condensed by a separate condenser. Such a chemical heat pump can be used for air conditioning and heating in automobiles, residences, and production facilities.

Figure 11A:
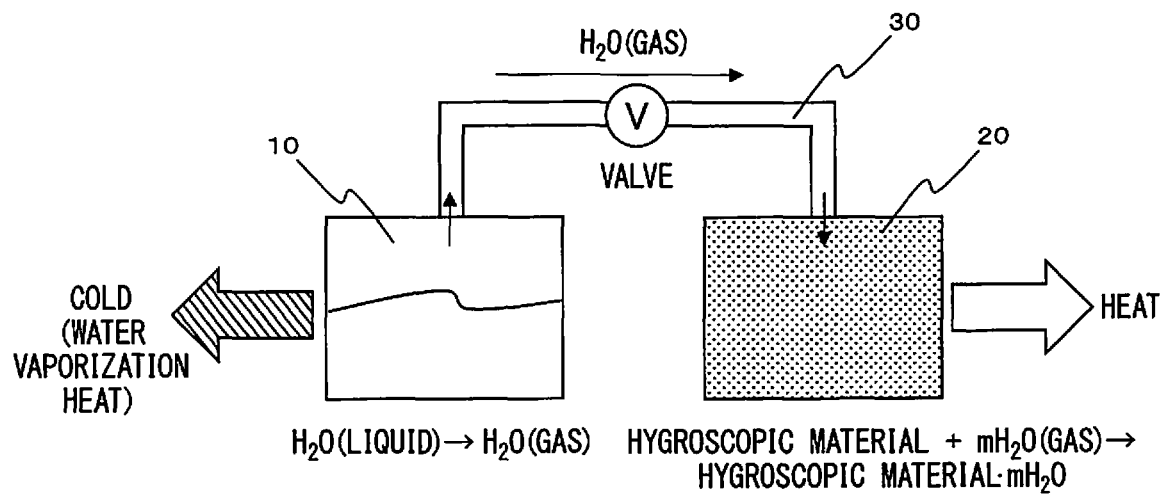
FIG. 11A and FIG. 11B are schematic views of a heat pump using a coordinatively unsaturated MOF.

An aspect in which the water storage part is used as both an evaporator and a condenser in such a chemical heat pump will be described. As shown on, for example, the left side of FIG. 11A, heat is supplied from the outside to the water (liquid $H_2O$) in the water storage part 10 to vaporize the water in the water storage tank, whereby water vapor (gaseous $H_2O$) is produced. This stage can also be referred to as a stage in which cold is supplied from the water storage part to the outside by vaporizing the water in the water storage part to water vapor. At this time, in such a chemical heat pump, as shown on the right side of FIG. 11A, the water vapor generated by the water storage part 10 is supplied to the hygroscopic material retention part 20 through the water vapor flow path 30, reacts with the hygroscopic material, and supplies adsorption heat to the outside. In other words, in such a heat pump, heat can move from the water storage part 10 side to the hygroscopic material retention part 20 side.

Figure 11B:
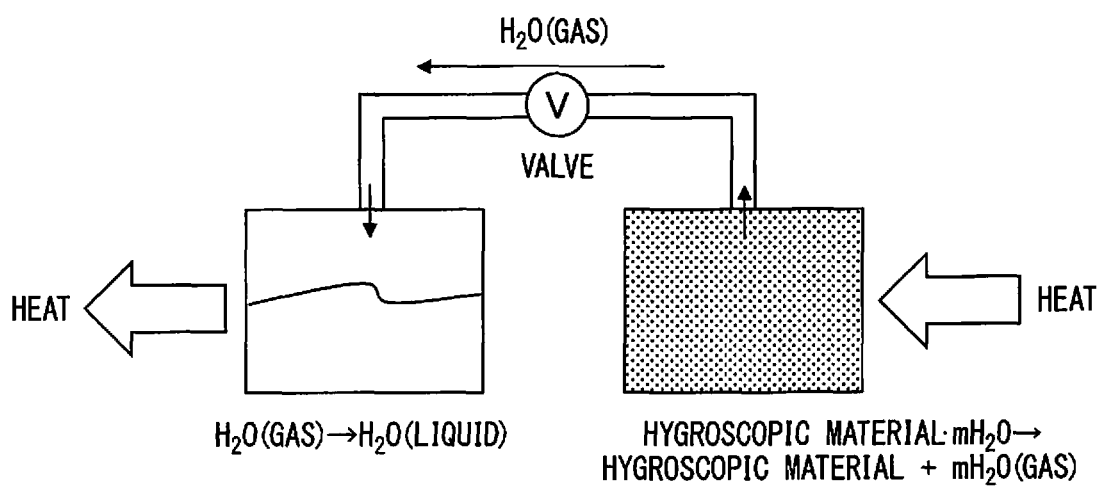

Furthermore, in such a chemical heat pump, in a regeneration stage in which the reaction shown in FIG. 11A can again be performed, as shown on the right side of FIG. 11B, heat is supplied from the outside to the hygroscopic material retention part 20 and water is desorbed from the hygroscopic material to produce water vapor. This stage can also be referred to as a stage in which cold is supplied to the outside from the hygroscopic material retention part 20 by desorbing water from the hygroscopic material in the hygroscopic material retention part 20. At this time, in such a chemical heat pump, as shown on the left side of FIG. 11B, the water vapor generated in the hygroscopic material retention part 20 is supplied to the water storage part 10 and is condensed, whereby latent condensation heat is supplied to the outside.

Humidity Control System

The coordinatively unsaturated metal-organic framework of the present disclosure can be used as, for example, the hygroscopic material in a humidity control system. The humidity control system in this case comprises a hygroscopic material retention part for retaining hygroscopic material, an air supply flow path for supplying air including water vapor to the hygroscopic material retention part, and an air discharge flow path for discharging the air supplied to the hygroscopic material retention part from the hygroscopic material retention part. Such a humidity control system can be used for the dehumidification or moisture control of vehicles, residences, and production facilities.

Figure 12A:
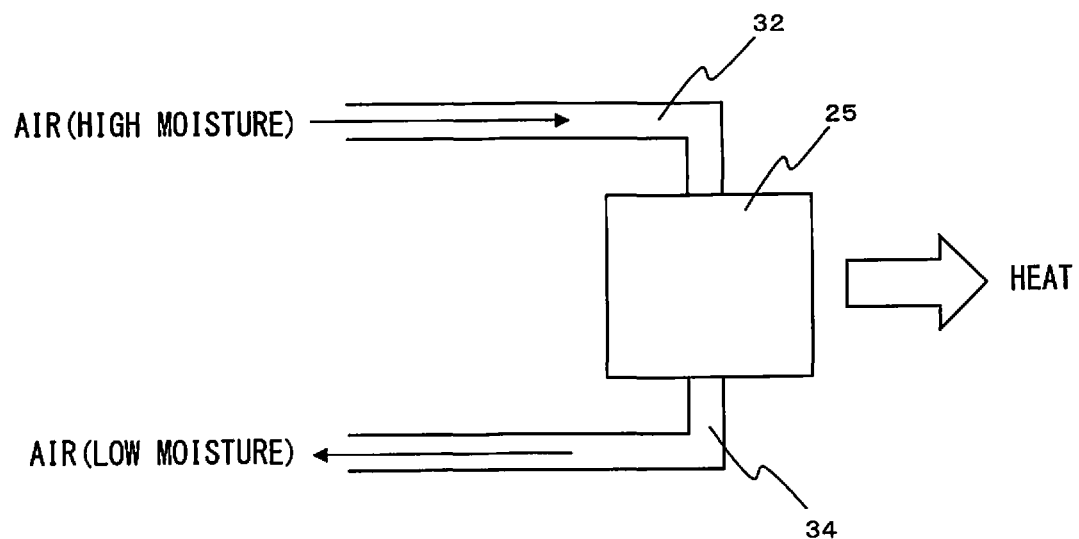
FIG. 12A and FIG. 12B are schematic views of a humidity control system using a coordinatively unsaturated MOF.

In this humidity control system, as shown in, for example, FIG. 12A, air containing a relatively large amount of water vapor is supplied from the outside to the hygroscopic material retention part 25 through the air supply flow path 32, and at least a part of the water vapor in the air in the hygroscopic material retention part 25 is adsorbed and removed by the hygroscopic material. At that time, in the hygroscopic material retention part 25, adsorption heat is generated as a result of the adsorption of the water vapor by the hygroscopic material. Thereafter, at least a part of the water vapor in the hygroscopic material retention part 25 is removed, and air having a relatively small amount of water vapor is discharged from the hygroscopic material retention part through the air discharge flow path 34. "A relatively small amount" and "a relatively high amount" of water vapor have relative meanings, and thus, air having a relatively small amount of water vapor means air having less water vapor as compared to the air having a relatively high amount of water vapor.

Figure 12B:
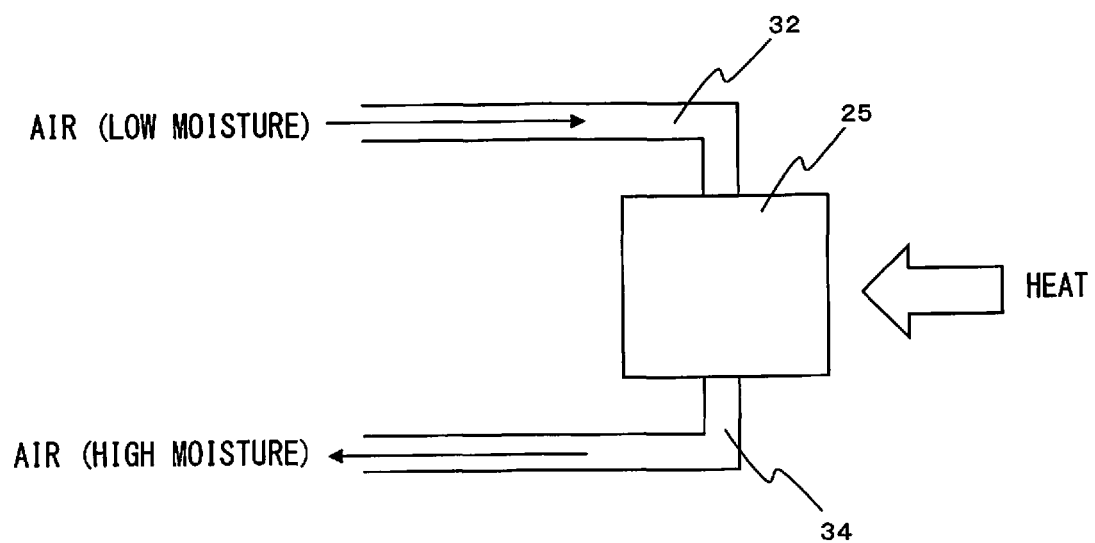

Furthermore, in this humidity control system, in a regeneration stage in which the reaction shown in FIG. 12A can again be carried out, as shown in FIG. 12B, air having a relatively small amount of water vapor is supplied from the outside to the hygroscopic material retention part 25 through the air supply flow path 32 while heat is supplied from the outside to the hygroscopic material retention part 25, and as a result, at least part of the water vapor which has been adsorbed by the hygroscopic material in the hygroscopic material retention part 25 is discharged in the air. Thereafter, in the hygroscopic material retention part 25, water vapor is added and air having a relatively high content of water vapor is discharged from the hygroscopic material retention part through the air outlet flow path 34. This regeneration stage can also be performed as an air humidification stage. Note that in this regeneration stage, it is also possible to reverse the flow of air, i.e., to introduce air from the air discharge flow path 34 and discharge air from the air supply flow path 32. Similarly to the above, "a relatively small amount" and "a relatively large amount" of water vapor have relative meanings.

EXAMPLES

Synthesis of Metal-Organic Framework (MOF)

The metal-organic frameworks (MOF) of the Examples and Comparative Examples were synthesized using the reagents shown in Table 1.

TABLE 1

| Reagent Name | Chemical Formula or Abbreviated Name | Obtained From |
|---|---|---|
| Zirconium Oxychloride Octahydrate | $ZrOCl_2 \cdot 8H_2O$ | Sigma-Aldrich |
| Hafnium Oxychloride Octahydrate | $HfOCl_2 \cdot 8H_2O$ | Alfa Aesar |
| Trimesic Acid | $H_3BTC$ | Sigma-Aldrich |
| Isophthalic Acid | $m-H_2BDC$ | Tokyo Chemical Industries Co. |
| Terephthalic Acid | $p-H_2BDC$ | Tokyo Chemical Industries Co. |
| Acetic Acid | AcOH | Wako Pure Chemical Industries Co. |
| Formic Acid | HCOOH | Wako Pure Chemical Industries Co. |
| N,N-dimethylformamide | DMF | Wako Pure Chemical Industries Co. |
| N,N-diethylformamide | DEF | Tokyo Chemical Industries Co. |
| Acetone | $CH_3COCH_3$ | Wako Pure Chemical Industries Co. |
| Lithium Chloride | LiCl | Wako Pure Chemical Industries Co. |
| Magnesium Chloride | $MgCl_2$ | Sigma-Aldrich |
| Aluminum Chloride | $AlCl_3$ | Sigma-Aldrich |
| Scandium Chloride | $ScCl_3$ | Sigma-Aldrich |

TABLE 1-continued

| Reagent Name | Chemical Formula or Abbreviated Name | Obtained From |
|---|---|---|
| Yttrium Chloride | $YCl_3$ | Sigma-Aldrich |
| Hafnium Chloride (IV) | $HfCl_4$ | Strem Chemicals |
| Magnesium Boride | $MgBr_2$ | Sigma-Aldrich |
| Titanocene Dichloride | $TiCp_2Cl_2$ | Tokyo Chemical Industries Co. |

Comparative Example A-1 (Preparation of Zr-BTC/m-BDC (A))

Figure 3:
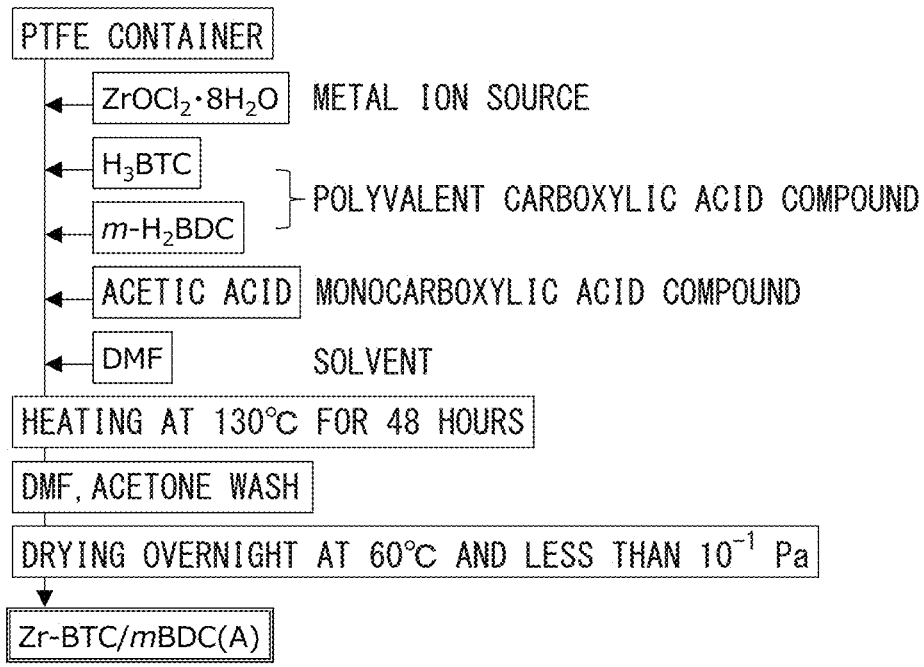
FIG. 3 is a flowchart of the production method of Comparative Example A-1.

A product was obtained by the following steps (1) to (3). FIG. 3 shows a flowchart of the production method of Comparative Example A-1.

(1) 387 mg (120 mmol) of zirconium oxychloride octahydrate ($ZrOCl_2 \cdot 8H_2O$), 76 mg (36 mmol) of trimesic acid ($H_3BTC$), 7 mg (4 mmol) of isophthalic acid ($m-H_2BDC$), 20 mL of acetic acid, and 20 mL of N,N-dimethylformamide (DMF) were added to a 100 mL PTFE container (HUT-100, manufactured by Sanai-Kagaku Co.).

(2) The PTFE container was loaded into a pressure-resistant stainless-steel outer cylinder (HUS-100, manufactured by Sanai-Kagaku Co.) and heated at 130° C. for 48 hours.

(3) The product was filtered, washed three times with 10 mL of DMF and three times with 10 mL of acetone, and thereafter heated at 60° C. overnight while reducing the pressure to less than $10^{-1}$ Pa and dried to obtain the product (Zr-BTC/m-BDC (A)) as a white powder. The obtained product was a metal-organic framework having a structure in which an acetic acid ion as the monodentate ligand and a trimesic acid ion and an isophthalic acid ion as polydentate ligands were coordinated to a zirconium ion.

Comparative Example X-1 (Preparation of (Zr-BTC/m-BDC (A); DMF Immersion (30° C.))

The product of Comparative Example X-1 was obtained by the following steps (1) to (3).

(1) 187 mg of Zr-BTC/m-BDC (A) (about 0.8 mmol in terms of Zr) as a precursor MOF, and 40 mL of N,N-dimethylformamide (DMF) as a solvent were added to a 110 mL vial.

(2) The 110 mL vial was heated at 30° C. for 48 hours.

(3) The product was filtered, washed three times with 10 mL of DMF and three times with 10 mL of acetone, and thereafter heated at 60° C. overnight while reducing the pressure to $10^{-1}$ Pa or less and dried to obtain the product.

Example A-1

Figure 4:
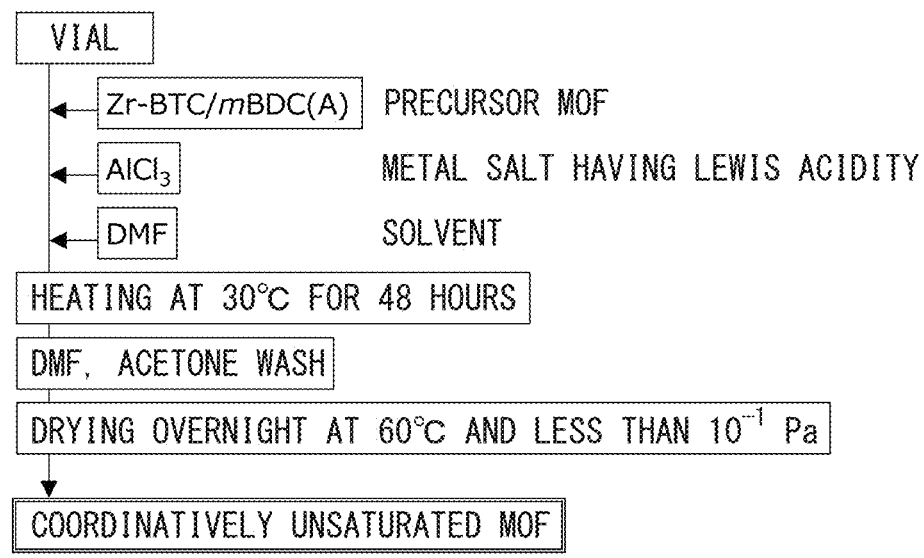
FIG. 4 is a flowchart of the production method of Example A-1.

The product of Example A-1 was obtained by the following steps (1) to (3). The obtained product was a coordinatively unsaturated MOF in which a part of the acetic acid ions as the ligand were desorbed. FIG. 4 shows a flowchart of the production method of Example A-1.

(1) 187 mg of Zr-BTC/m-BDC (A) (about 0.8 mmol in terms of Zr) as a precursor MOF, 107 mg (0.8 mmol) of aluminum chloride ($AlCl_3$), and 40 mL of N,N-dimethylformamide (DMF) as a solvent were added to a 110 mL vial.

(2) The 110 mL vial was heated at 30° C. for 48 hours.

(3) The product was filtered, washed three times with 10 mL of DMF and three times with 10 mL of acetone, and

Example A-2

A product was obtained in the same manner as Example A-1 except that 121 mg (0.8 mmol) of scandium chloride (ScCl$_3$) was added in place of the aluminum chloride in step (1) of Example A-1.

Example A-3

A product was obtained in the same manner as Example A-1 except that 156 mg (0.8 mmol) of yttrium chloride (YCl$_3$) was added in place of the aluminum chloride in step (1) of Example A-1.

Example A-4

A product was obtained in the same manner as Example A-1 except that 469 mg (2.4 mmol) of yttrium chloride (YCl$_3$) was added in place of the aluminum chloride in step (1) of Example A-1.

Example A-5

A product was obtained in the same manner as Example A-1 except that 1562 mg (8 mmol) of yttrium chloride (YCl$_3$) was added in place of the aluminum chloride in step (1) of Example A-1.

Example A-6

A product was obtained in the same manner as Example A-2 except that the heating temperature in step (2) of Example A-2 was changed to 80° C.

Example A-7

A product was obtained in the same manner as Example A-3 except that the heating temperature in step (2) of Example A-3 was changed to 80° C.

Example A-8

A product was obtained in the same manner as Example A-4 except that the heating temperature in step (2) of Example A-4 was changed to 80° C.

Example A-9

A product was obtained in the same manner as Example A-2 except that the solvent in step (1) of Example A-2 was changed from DMF to water.

Example A-10

A product was obtained in the same manner as Example A-3 except that the solvent in step (1) of Example A-3 was changed from DMF to water.

Example A-11

A product was obtained in the same manner as Example A-4 except that the solvent in step (1) of Example A-4 was changed from DMF to water.

Example A-12

A product was obtained in the same manner as Example A-1 except that 34 mg (0.8 mmol) of lithium chloride (LiCl) was added in place of the aluminum chloride of step (1) in Example A-1.

Example A-13

A product was obtained in the same manner as Example A-1 except that 76 mg (0.8 mmol) of magnesium chloride (MgCl$_2$) was added in place of the aluminum chloride in step (1) of Example A-1.

Example A-14

A product was obtained in the same manner as Example A-1 except that 256 mg (0.8 mmol) of hafnium chloride (HfCl$_4$) was added in place of the aluminum chloride in step (1) of Example A-1.

Comparative Example B-1 (Preparation of Zr-BTC (F)

The product of Comparative Example B-1 was obtained by the following steps (1) to (3).

(1) 387 mg (120 mmol) of zirconium oxychloride octahydrate (ZrOCl$_2$·8H$_2$O), 84 mg (40 mmol) of trimesic acid (H$_3$BTC), 20 mL of formic acid, and 20 mL of N,N-dimethylformamide (DMF) were added to a 100 mL PTFE container (HUT-100, manufactured by Sanai-Kagaku Co.).

(2) The PTFE container was loaded into a pressure-resistant stainless-steel outer cylinder (HUS-100, manufactured by Sanai-Kagaku Co.) and heated at 130° C. for 48 hours.

(3) The product was filtered, washed three times with 10 mL of DMF and three times with 10 mL of acetone, and thereafter heated at 60° C. overnight while reducing the pressure to less than 10$^{-1}$ Pa and dried to obtain Zr-BTC (F) as a white powder.

Example B-1

A product was obtained in the same manner as Example A-14 except that, in step (1) of Example A-14, 182 mg (0.8 mmol in terms of Zr) of Zr-BTC (F) was used in place of the Zr-BTC/m-BDC(A), the amount of N,N-dimethylformamide (DMF) was changed to 80 mL, and the amount of hafnium chloride (HfCl$_4$) was changed to 769 mg (2.4 mmol).

Comparative Example C-1 (Preparation of Zr-p-BDC (A))

The product of Comparative Example C-1 was obtained by the following steps (1) to (3).

(1) 387 mg (120 mmol) of zirconium oxychloride octahydrate (ZrOCl$_2$·8H$_2$O), 199 mg (120 mmol) of terephthalic acid (p-H$_2$BTC), 10 mL of acetic acid, and 30 mL of N,N-dimethylformamide (DMF) were added to a 100 mL PTFE container (HUT-100, manufactured by Sanai-Kagaku Co.).

(2) The PTFE container was loaded into a pressure-resistant stainless-steel outer cylinder (HUS-100, manufactured by Sanai-Kagaku Co.) and heated at 130° C. for 48 hours.

(3) The product was filtered, washed three times with 10 mL of DMF and three times with 10 mL of acetone, and thereafter heated at 60° C. overnight while reducing the pressure to less than $10^{-1}$ Pa and dried to obtain Zr-p-BDC (A) as a white powder.

Comparative Example C-2

A product was obtained in the same manner as Example A-1 except that, in step (1) of Example A-1, 222 mg (about 0.8 mmol in terms of Zr) of Zr-p-BDC (A) was used in place of the Zr-BTC/m-BDC (A), and aluminum chloride was not used.

Example C-1

A product was obtained in the same manner as Example A-3 except that, in step (1) of Example A-3, 222 mg (about 0.8 mmol in terms of Zr) of Zr-p-BDC (A) was used in place of the Zr-BTC/m-BDC (A).

Example X-1

A product was obtained in the same manner as Example A-1 except that 4.69 g (24.0 mmol) of yttrium chloride ($YCl_3$) was added in place of the aluminum chloride in step (1) of Example A-1.

Example X-2

A product was obtained in the same manner as Example A-1 except that 2.56 g (8.0 mmol) of hafnium chloride ($HfCl_4$) was added in place of the aluminum chloride in step (1) of Example A-1.

Example X-3

A product was obtained in the same manner as Example X-2 except that, in step (1) of Example X-2, N,N-diethyl-formamide (DEF) was used as the solvent in place of the N,N-dimethylformamide (DMF).

Example X-4

A product was obtained in the same manner as example A-1 except that 7.69 g (24.0 mmol) of hafnium chloride ($HfCl_4$) was added in place of the aluminum chloride in step (1) of Example A-1.

The synthesis conditions of the obtained MOFs are shown in Table 2.

TABLE 2

| | MOF | Zr/Hf Concentration (mmol·$L^{-1}$) | Acid | Acid Concentration (mmol·$L^{-1}$) | Solvent | Temp (° C.) | Time (h) |
|---|---|---|---|---|---|---|---|
| Comp Ex A-1 | Zr-BTC/m-BDC (A) | — | — | — | — | — | — |
| Comp Ex X-1 | Zr-BTC/m-BDC (A) | 20 | — | — | DMF | 30 | 48 |
| Ex A-1 | Zr-BTC/m-BDC (A) | 20 | $AlCl_3$ | 20 | DMF | 30 | 48 |
| Ex A-2 | Zr-BTC/m-BDC (A) | 20 | $ScCl_3$ | 20 | DMF | 30 | 48 |
| Ex A-3 | Zr-BTC/m-BDC (A) | 20 | $YCl_3$ | 20 | DMF | 30 | 48 |
| Ex A-4 | Zr-BTC/m-BDC (A) | 20 | $YCl_3$ | 60 | DMF | 30 | 48 |
| Ex A-5 | Zr-BTC/m-BDC (A) | 20 | $YCl_3$ | 200 | DMF | 30 | 48 |
| Ex A-6 | Zr-BTC/m-BDC (A) | 20 | $ScCl_3$ | 20 | DMF | 80 | 48 |
| Ex A-7 | Zr-BTC/m-BDC (A) | 20 | $YCl_3$ | 20 | DMF | 80 | 48 |
| Ex A-8 | Zr-BTC/m-BDC (A) | 20 | $YCl_3$ | 60 | DMF | 80 | 48 |
| Ex A-9 | Zr-BTC/m-BDC (A) | 20 | $ScCl_3$ | 20 | Water | 30 | 48 |
| Ex A-10 | Zr-BTC/m-BDC (A) | 20 | $YCl_3$ | 20 | Water | 30 | 48 |
| Ex A-11 | Zr-BTC/m-BDC (A) | 20 | $YCl_3$ | 60 | Water | 30 | 48 |
| Ex A-12 | Zr-BTC/m-BDC (A) | 20 | LiCl | 20 | DMF | 30 | 48 |
| Ex A-13 | Zr-BTC/m-BDC (A) | 20 | $MgCl_2$ | 20 | DMF | 30 | 48 |
| Ex A-14 | Zr-BTC/m-BDC (A) | 20 | $HfCl_4$ | 20 | DMF | 30 | 48 |
| Comp Ex B-1 | Zr-BTC (F) | — | — | — | — | — | — |
| Ex B-1 | Zr-BTC (F) | 10 | $HfCl_4$ | 30 | DMF | 30 | 48 |
| Comp Ex C-1 | Zr-p-BDC (A) | — | — | — | — | — | — |
| Comp Ex C-2 | Zr-p-BDC (A) | 20 | — | — | DMF | 30 | 48 |
| Ex C-1 | Zr-p-BDC (A) | 20 | $YCl_3$ | 20 | DMF | 30 | 48 |
| Ex X-1 | Zr-BTC/m-BDC (A) | 20 | $YCl_3$ | 600 | DMF | 30 | 48 |
| Ex X-2 | Zr-BTC/m-BDC (A) | 20 | $HfCl_4$ | 200 | DMF | 30 | 48 |
| Ex X-3 | Zr-BTC/m-BDC (A) | 20 | $HfCl_4$ | 200 | DEF | 30 | 48 |
| Ex X-4 | Zr-BTC/m-BDC (A) | 20 | $HfCl_4$ | 600 | DMF | 30 | 48 |

EVALUATION ($^1$H-NMR Measurement (MOF Composition Analysis))

After decomposing the products, the $^1$H-NMR spectrum of the solution was measured to obtain the ratio of the ligands in the MOF from the integral ratio. The separation conditions, measurement device, and measurement conditions are shown below.

Decomposition Conditions: 1 mL of bisulfate ($D_2SO_4$) was added to about 10 mg of product (MOF) and agitated Measurement Device: JNM-AL400 (Manufactured by JEOL)

Measurement Conditions: The $^1$H-NMR spectrum of the solution was measured using tetramethylsilane (TMS) as an internal baseline Composition Calculation: Using $(M_6O_4(OH)_4)(BTC)_a(BDC)_b(OAc)_c(OH)_d(DMF)_e(H_2O)_f$ (M is Zr), the values of a to f were determined so as to satisfy the following three equations, whereby the coordination number and charge are balanced and so as to satisfy the ratio of a, b, c, and e obtained from the $^1$H-NMR spectrum.

$6 = 3a + 2b$ $12 = 3a + 2b + c + d$ $24 = 6a + 4b + 2c + d + e + f$

The ratio of ligands constituting the Zr-BTC/m-BDC (A) (Comparative Example A-1) prior to immersion in a solution (Lewis acid solution) of a metal salt having a Lewis acidity, and the ratio of ligands constituting the Zr-BTC/m-BDC (A) (Example A-3: 20 mmol·L$^{-1}$; Example A-4: 60 mmol·L$^{-1}$; and Example A-5: 200 mmol·L$^{-1}$) after immersion in solutions having different concentrations of YCl$_3$ (metal salt having a Lewis acidity) are shown in FIG. 5.

Figure 5:
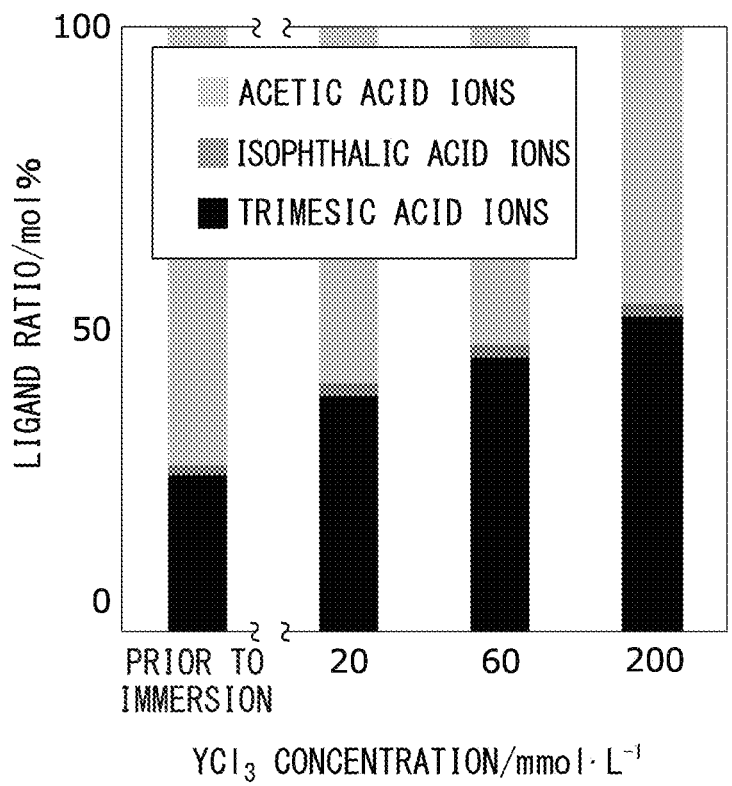
FIG. 5 shows the ratio of the ligands constituting the MOFs of Comparative Example A-1, Example A-3, Example A-4, and Example A-5.

It could be understood from FIG. 5 that as the concentration of YCl$_3$ increased, the ratio of acetic acid ions in the MOF decreased. Furthermore, as shown in Table 2, from the compositions of the MOFs obtained from Formulae 1 to 3, it could be understood that since the contents of trimesic acid ions and isophthalic acid ions (a and b) did not significantly change and only the content (c) of acetic acid ions decreased, acetic acid ions (monocarboxylic acid ions) in the MOFs were selectively desorbed by immersion in a Lewis acid solution.

ICP-AES Measurement (Analysis of Impurities Derived from Metal Salt Having Lewis Acidity)

After decomposing, the products were diluted with ultrapure water to quantitatively analyze the metal elements derived from the metal salt having a Lewis acidity. The decomposition conditions and measurement device are shown below.

Decomposition Conditions: nitric acid (HNO$_3$) and sulfuric acid (H$_2$SO$_4$) were added to the product and heated Measurement Device: SPS5100 (manufactured by SII Nanotechnology Co.)

The types and contents of impurity metals contained in the products after immersion in the Lewis acid solution are shown in Table 3. From Table 3, it could be understood that though the contents thereof depended on the washing step, metal elements derived from the metal salt having a Lewis acidity remained in the product.

Water Vapor Adsorption/Desorption Measurement (Evaluation of Water Vapor Adsorption/Desorption Characteristics)

After pretreating, the water vapor adsorption/desorption isotherms of the products were measured and the amounts of water vapor adsorption at 0% to 40% relative humidity were determined. The pretreatment device, pretreatment conditions, measurement device, and measurement conditions are shown below.

Pretreatment Device: BELPREP-vacII (manufactured by MicrotracBEL Corp.)

Pretreatment Conditions: Heating at 130° C. for 6 hours, under a vacuum of less than 10$^{-2}$ Pa Measurement Device: BELSORP-max (manufactured by MicrotracBEL Corp.)

Measurement Conditions: The water vapor adsorption amount was measured at a temperature of 20° C. at a relative humidity in the range of 0 to 85%

The differences in the adsorption humidity and the difference in adsorption humidity before and after immersion in a Lewis acid solution of the Examples and the Comparative Examples are shown in Table 3. Note that the difference in adsorption humidity before and after immersion in a Lewis acid solution was obtained from the difference in adsorption humidity of the MOF (Examples A-1 to A-14, B-1, C-1, and X-1 to X-4) as well as the MOFs of other Comparative Examples (Comparative Examples X-1 and C-2) after immersion in the Lewis acid solution with respect to the adsorption humidity of the MOF prior to immersion in a Lewis acid solution (the adsorption humidity of Comparative Examples A-1, B-1, and C-1), and are shown in Table 3 as humidity differences. From Table 3, it could be understood that after immersion in a Lewis acid solution, the adsorption humidity of the MOF decreased significantly (2.3% to 14.5%).

TABLE 3

| | a | b | c | d | e | f | Acetic Acid Ion Residual Amount (%) | Metal Impurity Type | Metal Impurity Content (%) | Adsorption Humidity (%) | Humidity Change (%) |
|---|---|---|---|---|---|---|---|---|---|---|---|
| | MOF Composition $(M_6O_4(OH)_4)(BTC)_a(BDC)_b(OAc)_c(OH)_d(DMF)_e(H_2O)_f$ (M is Zr or Hf) | | | | | | | | | | |
| Comp Ex A-1 | 1.94 | 0.05 | 6.00 | 0.00 | 1.04 | 0.00 | 100 | — | — | 32.0 | 0.0 |
| Comp Ex X-1 | 1.94 | 0.05 | 5.78 | 0.22 | 1.09 | 0.00 | 96 | — | — | 31.9 | 0.0 |

TABLE 3-continued

| | a | b | c | d | e | f | Acetic Acid Ion Residual Amount (%) | Metal Impurity Type | Metal Impurity Content (%) | Adsorption Humidity (%) | Humidity Change (%) |
|---|---|---|---|---|---|---|---|---|---|---|---|
| Ex A-1 | 1.96 | 0.07 | 4.68 | 1.32 | 1.38 | 0.00 | 78 | Al | 9.4 | 26.1 | −5.8 |
| Ex A-2 | 1.94 | 0.09 | 3.02 | 2.98 | 1.41 | 1.58 | 50 | Sc | 1.5 | 23.5 | −8.5 |
| Ex A-3 | 1.93 | 0.10 | 2.89 | 3.11 | 1.08 | 2.03 | 48 | Y | 1.6 | 23.9 | −8.0 |
| Ex A-4 | 1.94 | 0.09 | 2.24 | 3.76 | 1.65 | 2.10 | 37 | Y | 3.1 | 21.2 | −10.7 |
| Ex A-5 | 1.95 | 0.08 | 1.71 | 4.29 | 3.03 | 1.26 | 29 | Y | 5.6 | 18.3 | −13.7 |
| Ex A-6 | 1.94 | 0.09 | 2.89 | 3.11 | 1.01 | 2.10 | 48 | Sc | 1.2 | 22.8 | −9.2 |
| Ex A-7 | 1.94 | 0.09 | 3.04 | 2.96 | 0.77 | 2.19 | 51 | Y | 1.3 | 24.9 | −7.0 |
| Ex A-8 | 1.95 | 0.08 | 2.32 | 3.68 | 1.13 | 2.55 | 39 | Y | 3.8 | 23.1 | −8.9 |
| Ex A-9 | 1.94 | 0.09 | 1.86 | 4.14 | 2.67 | 1.47 | 31 | Sc | 1.8 | 21.0 | −11.0 |
| Ex A-10 | 1.95 | 0.08 | 4.31 | 1.68 | 0.69 | 0.98 | 72 | Y | 2.1 | 26.3 | −5.7 |
| Ex A-11 | 1.95 | 0.08 | 3.12 | 2.87 | 1.09 | 1.78 | 52 | Y | 4.7 | 24.1 | −7.9 |
| Ex A-12 | 1.94 | 0.09 | 4.78 | 1.22 | 1.07 | 0.15 | 83 | Li | 0 | 29.4 | −2.6 |
| Ex A-13 | 1.94 | 0.09 | 3.75 | 2.25 | 1.07 | 1.18 | 63 | Mg | 0 | 25.8 | −6.2 |
| Ex A-14 | 1.96 | 0.07 | 0.69 | 5.29 | 4.02 | 1.27 | 11 | Hf | 1.2 | 19.1 | −12.9 |
| Comp Ex B-1 | — | — | — | — | — | — | — | — | — | 28.1 | 0.0 |
| Ex B-1 | — | — | — | — | — | — | — | Hf | 4.3 | 23.3 | −4.8 |
| Comp Ex C-1 | — | — | — | — | — | — | — | — | — | 32.9 | 0.0 |
| Comp Ex C-2 | — | — | — | — | — | — | — | Y | 1.2 | 33.6 | 0.7 |
| Ex C-1 | — | — | — | — | — | — | — | — | — | 30.6 | −2.3 |

MOF Composition
$F(M_6O_4(OH)_4)(BTC)_a(BDC)_b(OAc)_c(OH)_d(DMF)_e(H_2O)_f$
(M is Zr or Hf)

| | a | b | c | d | e | f | Acetic Acid Ion Residual Amount (%) | Metal Impurity Type | Metal Impurity Content (%) | Adsorption Humidity (%) | Humidity Change (%) |
|---|---|---|---|---|---|---|---|---|---|---|---|
| Ex X-1 | 1.95 | 0.04 | 3.02 | 2.98 | 2.29 | 0.68 | 50 | Y | 0.7 | 23.0 | −9.0 |
| Ex X-2 | 1.97 | 0.03 | 0.30 | 5.70 | 4.07 | 1.64 | 5 | Hf | 1.7 | 18.8 | −13.2 |
| Ex X-3 | 1.97 | 0.02 | 0.41 | 5.59 | 4.15 | 1.44 | 7 | Hf | 1.6 | 19.0 | −13.0 |
| Ex X-4 | 1.99 | 0.01 | 0.01 | 5.99 | 6.06 | 0.00 | 0 | Hf | 18 | 17.5 | −14.5 |

Figure 6:
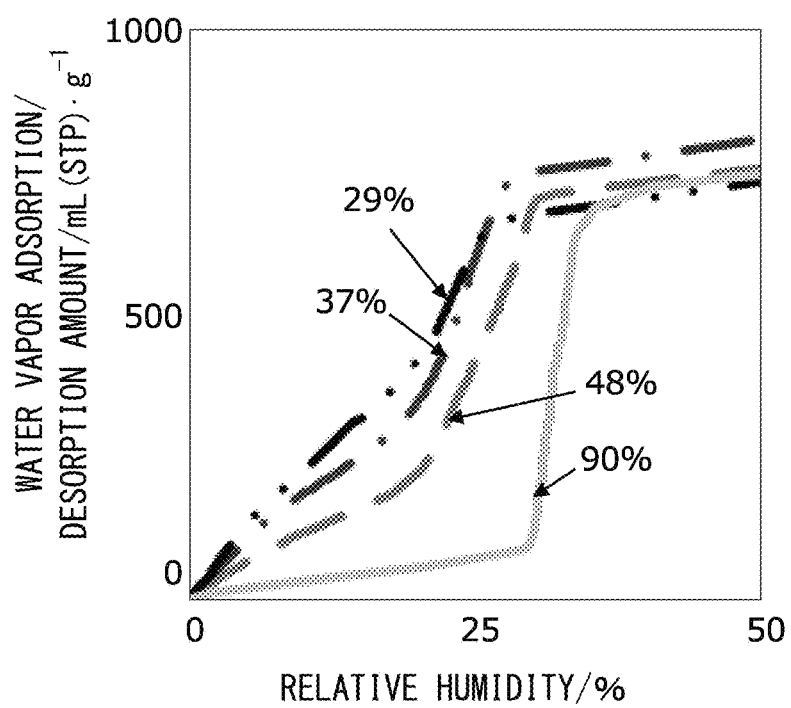
FIG. 6 shows the water vapor adsorption/desorption isotherms at 20° C. of Example A-3, Example A-4, and Example A-5.

The water vapor adsorption/desorption isotherms at 20° C. of Comparative Example A-1, Example A-3, Example A-4, and Example A-5 are shown in FIG. 6. In the water vapor adsorption curves of Example A-3 (residual amount of acetic acid ions: 48%), Example A-4 (residual amount of acetic acid ions: 37%), and Example A-5 (residual amount of acetic acid ions: 29%), the rising edge shifted to the low humidity side (the left side of FIG. 6) as compared with Comparative Example A-1 (residual amount of acetic acid ions: 90%). Furthermore, the smaller the residual amount of acetic acid ions, the greater the shift amount of the water vapor adsorption curve.

Note that the value of the residual amount of acetic acid ions (%) shown in Table 3 was determined by dividing the value of "c", which is the coefficient of "(OAc)" in the composition of the MOF, by six using the value of the case in which six monocarboxylic acid ions coordinated to the metal cluster as 100%.

Figure 7:
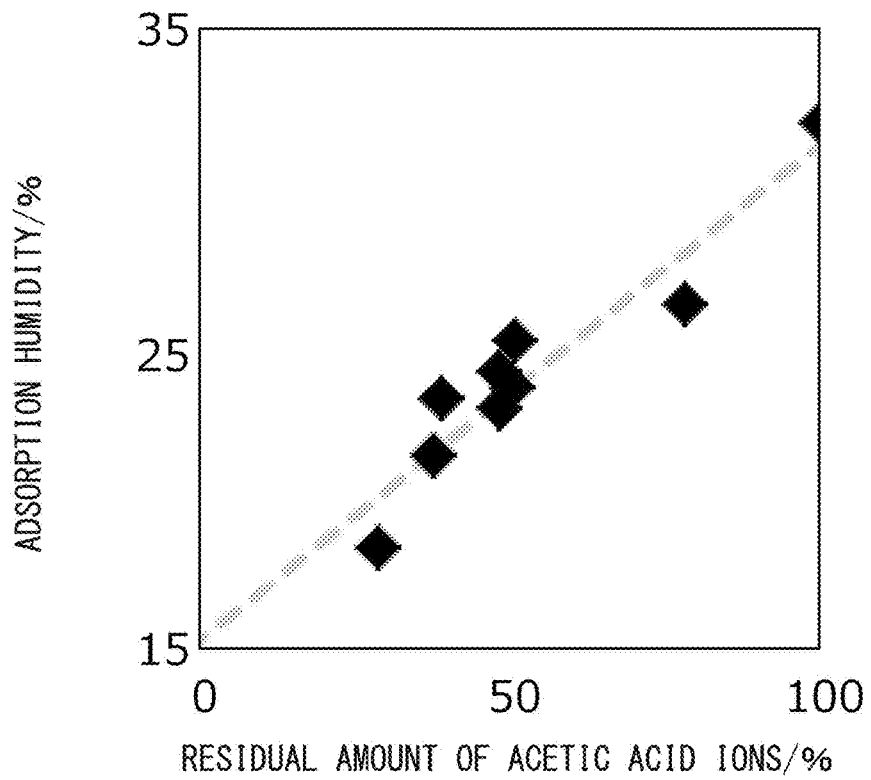
FIG. 7 is a graph showing the residual amount of acetic acid ions and adsorption humidity of Comparative Example A-1 and Examples A-1 to A-8.

The relative humidity when adsorbing water vapor in an amount equal to half the maximum water vapor adsorption amount was used as the adsorption humidity and is shown in FIG. 7 together with the residual amount of acetic acid ions. It could be understood that in Examples A-1 to A-8, the residual amount of acetic acid ions was reduced as compared with Comparative Example A-1, and the adsorption humidity decreased accordingly. Furthermore, there was a strong correlation between residual amount of acetic acid ions (%) and adsorption humidity (%).

Figure 13:
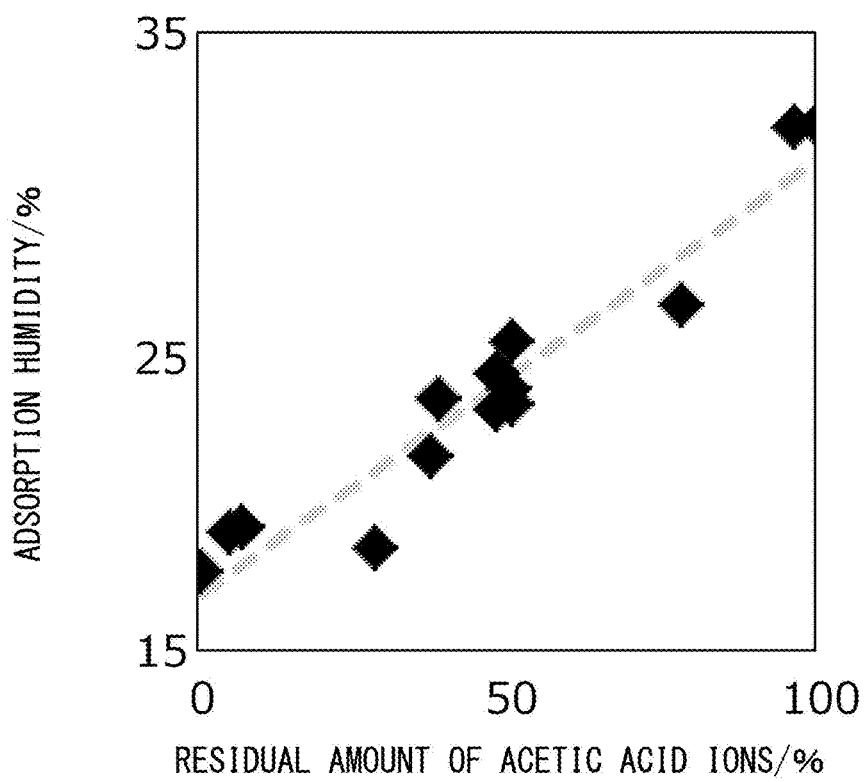
FIG. 13 is a graph showing the residual amount of acetic acid ions and adsorption humidity of Comparative Examples A-1 and X-1 and Examples A-1 to A-8 and X-1 to X-4.

Furthermore, the humidity at which the water vapor adsorption amounts of Comparative Examples A-1 and X-1 and Examples A-1 to A-8 and X-1 to X-4 reached half the value of 40% humidity were taken as the adsorption humidity and are shown in FIG. 13 along with the residual amounts of acetic acid ions. It could be understood that in Examples A-1 to A-8 and X-1 to X-4, the residual amount of acetic acid ions was reduced as compared with Comparative Examples A-1 and X-1, and the adsorption humidity decreased accordingly. Furthermore, there was a strong correlation between the residual amount of acetic acid ions (%) and adsorption humidity (%).

From the above results, it could be understood that by controlling the residual amount of monocarboxylic acid ions (acetic acid ions) in the coordinatively unsaturated MOF, the adsorption humidity of the coordinatively unsaturated MOF could be controlled.

Figure 8:
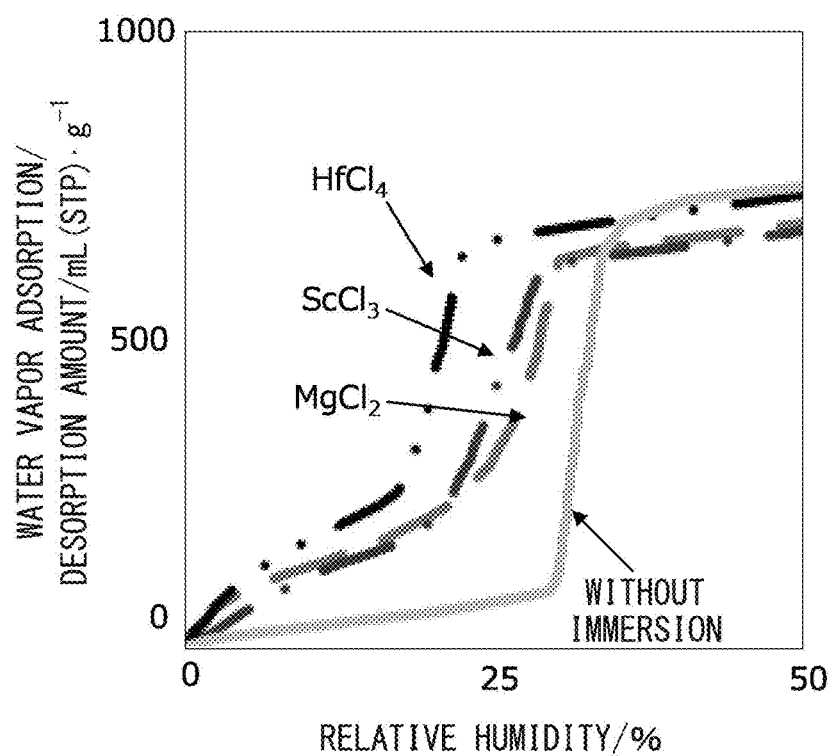
FIG. 8 shows the water vapor adsorption/desorption isotherms at 20° C. of Example A-2, Example A-13, and Example A-14.

The water vapor adsorption/desorption isotherms at 20° C. of Comparative Example A-1, Example A-2, Example A-13, and Example A-14 are shown in FIG. 8. In the water vapor adsorption curves of Example A-2 ($ScCl_3$), Example A-13 ($MgCl_2$), and Example A-14 ($HfCl_4$), the rising edge shifted toward the low relative humidity side (the left side in FIG. 8) as compared with Comparative Example A-1 (in which immersion in a Lewis acid solution was not performed).

Figure 9:
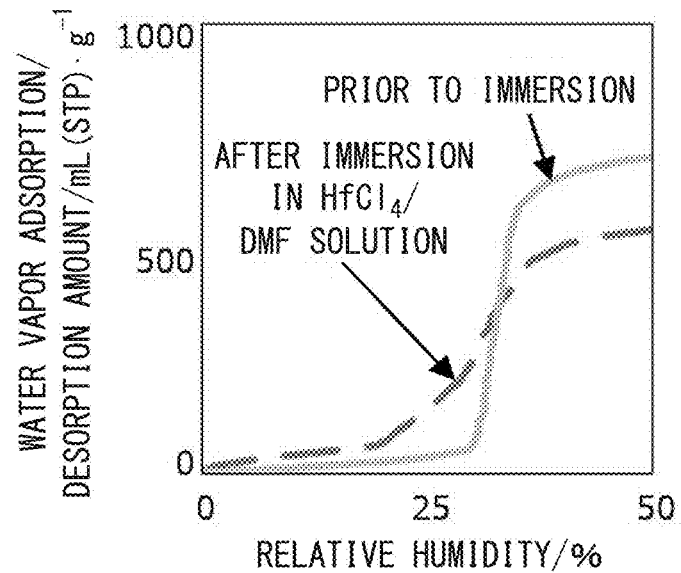
FIG. 9 shows the water vapor adsorption/desorption isotherms at 20° C. of Comparative Example B-1 and Example B-1.
Figure 10:
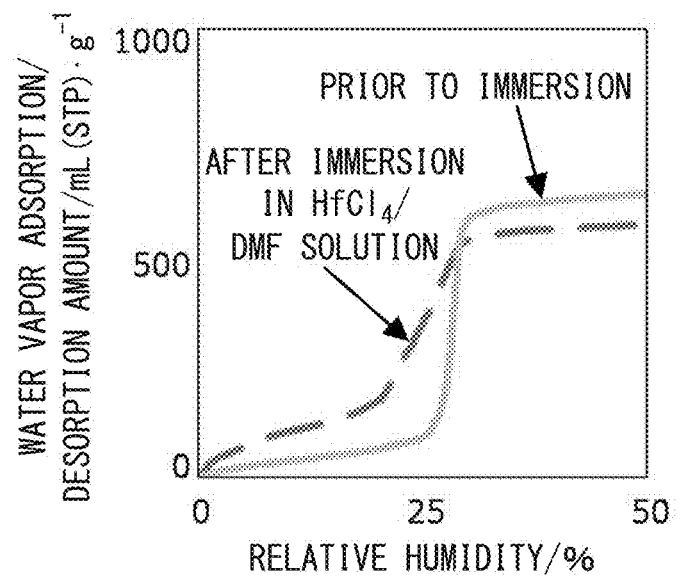
FIG. 10 shows the water vapor adsorption/desorption isotherms at 20° C. of Comparative Example C-1 and Example C-1.

The water vapor adsorption/desorption isotherms at 20° C. of Comparative Example B-1 and Example B-1 are shown in FIG. 9, and the water vapor adsorption/desorption isotherms at 20° C. of Comparative Example C-1 and Example C-1 are shown in FIG. 10. Even when the MOF was derived from Zr-BTC (F) or Zr-p-BDC (A), by immersing in an HfCl$_4$/DMF solution, the rising edge of the water vapor adsorption curve thereof shifted toward the lower humidity side (the left sides of FIGS. 9 and 10).

Figure 14:
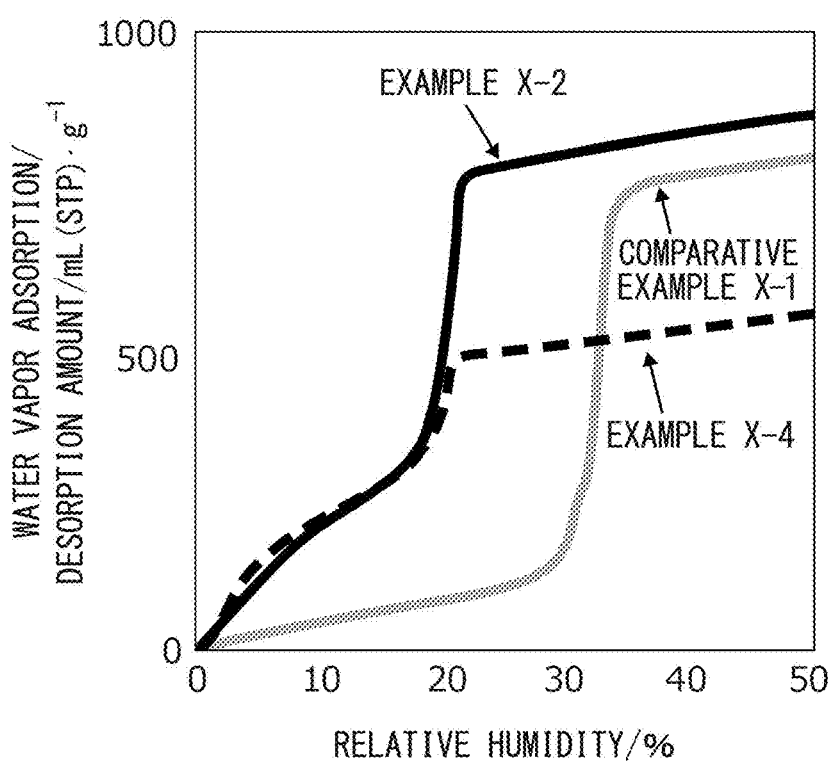
FIG. 14 shows the water vapor adsorption/desorption isotherms at 20° C. of Examples X-2 and X-4 and Comparative Example X-1.

The water vapor adsorption/desorption isotherms at 20° C. of Examples X-2 and X-4 and Comparative Example X-1 are shown in FIG. 14. In the water vapor adsorption curves of Examples X-2 and X-4, the rising edge shifted toward the low humidity side (the left side in FIG. 14) as compared with Comparative Example X-1. Note that in Example X-4, it could be seen that the water vapor adsorption amount decreased. This is presumed to be the result of the fact that the concentration of the metal salt having a Lewis acidity used was too high (for example, 600 mmol/L or more), whereby the polycarboxylic acid ions that coordinated to the metal cluster desorbed.

As can be understood from the results above, according to the present disclosure, it is possible to generate coordinatively unsaturated sites by using various kinds of metal salts having a Lewis acidity in various MOFs, and it is possible to control the adsorption humidity of the coordinatively unsaturated MOF based on the strength and quantity of the Lewis acidity of the metal salt.

The invention claimed is:

1. A method for producing a coordinatively unsaturated metal-organic framework, comprising:
    providing a precursor metal-organic framework comprising a metal cluster, and a polycarboxylic acid ion and a monocarboxylic acid ion which are coordinated to the metal cluster, and
    allowing the precursor metal-organic framework and a metal halide salt having a Lewis acidity to coexist in a solvent to desorb at least a part of the monocarboxylic acid ion which is coordinated to the metal cluster, from the metal cluster,
    wherein said coordinatively unsaturated metal-organic framework comprises;
    an M$_6$O$_{8-x}$(OH)$_x$ metal cluster, and carboxylic acid ions coordinated to the metal cluster,
    wherein M is a tetravalent group IV element ion or a rare earth ion,
    wherein the carboxylic acid ions coordinated to the metal cluster comprise a polycarboxylic acid ion as a polydentate ligand and a monocarboxylic acid ion as a monodentate ligand,
    wherein a plurality of the metal clusters are bonded to each other due to the polycarboxylic acid ion,
    wherein the amount of monocarboxylic acid ions coordinated to the metal cluster is 80% or less, when the maximum amount of monocarboxylic acid ions which can coordinate with the metal cluster is 100%, and
    wherein the maximum amount of monocarboxylic acid ions which can coordinate with the metal cluster is six for each metal cluster.

2. The method according to claim 1, wherein the polycarboxylic acid ion and the monocarboxylic acid ion coordinated to the metal cluster are a polycarboxylic acid ion as a polydentate ligand and a C$_{1-3}$ monocarboxylic acid ion as a monodentate ligand, respectively, and
    wherein less than six monocarboxylic acid ions are coordinated to each metal cluster.

3. The method according to claim 2, wherein M is at least one selected from the group consisting of Zr$^{4+}$, Hf$^{4+}$, and Ce$^{4+}$.

4. The method according to claim 1, wherein the monocarboxylic acid ion is at least one selected from the group consisting of a formic acid ion, an acetic acid ion, and a propionic acid ion.

5. A coordinatively unsaturated metal-organic framework, comprising:
    an M$_6$O$_{8-x}$(OH)$_x$ metal cluster, and carboxylic acid ions coordinated to the metal cluster,
    wherein M is a tetravalent group IV element ion or a rare earth ion,
    wherein the carboxylic acid ions coordinated to the metal cluster comprise a polycarboxylic acid ion as a polydentate ligand and a monocarboxylic acid ion as a monodentate ligand,
    wherein a plurality of the metal clusters are bonded to each other due to the polycarboxylic acid ion,
    wherein the amount of monocarboxylic acid ions coordinated to the metal cluster is 80% or less, when the maximum amount of monocarboxylic acid ions which can coordinate with the metal cluster is 100%, and
    wherein the maximum amount of monocarboxylic acid ions which can coordinate with the metal cluster is six for each metal cluster.

6. The coordinatively unsaturated metal-organic framework according to claim 5, wherein the amount of monocarboxylic acid ions coordinated to the metal cluster is in the range of 5% to 80%.

7. The coordinatively unsaturated metal-organic framework according to claim 6, wherein M is at least one selected from the group consisting of Zr$^{4+}$, Hf$^{4+}$, and Ce$^{4+}$.

8. The coordinatively unsaturated metal-organic framework according to claim 5, wherein the monocarboxylic acid ion is a C$_{1-3}$ monocarboxylic acid ion.

9. The coordinatively unsaturated metal-organic framework according to claim 5, wherein the monocarboxylic acid ion is at least one selected from the group consisting of a formic acid ion, an acetic acid ion, and a propionic acid ion.

10. The coordinatively unsaturated metal-organic framework according to claim 5, further comprising a out-of-cluster metal ion.

11. The coordinatively unsaturated metal-organic framework according to claim 10, wherein the out-of-cluster metal ion is at least one selected from the group consisting of Li$^+$, Mg$^{2+}$, Al$^{3+}$, Sc$^{3+}$, Y$^{3+}$, Ti$^{4+}$, Zr$^{4+}$, and Hf$^+$.

* * * * *